United States Patent
Hebrard

(10) Patent No.: US 8,512,007 B2
(45) Date of Patent: Aug. 20, 2013

(54) COMPRESSOR AND METHOD FOR CONTROLLING A COMPRESSOR FOR THE COMPRESSED AIR SUPPLY OF A COMMERCIAL VEHICLE

(75) Inventor: Gilles Hebrard, Caen (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 116 days.

(21) Appl. No.: 12/841,609

(22) Filed: Jul. 22, 2010

(65) Prior Publication Data

US 2011/0011663 A1  Jan. 20, 2011

Related U.S. Application Data

(63) Continuation of application No. PCT/EP2009/000142, filed on Jan. 13, 2009.

(30) Foreign Application Priority Data

Jan. 22, 2008 (DE) .......................... 10 2008 005 428

(51) Int. Cl.
  *F04B 49/00* (2006.01)
  *F04B 9/00* (2006.01)

(52) U.S. Cl.
  USPC ........................................... 417/223; 417/316

(58) Field of Classification Search
  USPC ........................ 417/15, 32, 42, 212, 223, 316
  See application file for complete search history.

(56) References Cited

U.S. PATENT DOCUMENTS

| | | | |
|---|---|---|---|
| 3,545,561 A * | 12/1970 | Woody et al. | 180/53.7 |
| 5,730,778 A * | 3/1998 | Hill et al. | 95/12 |
| 6,089,831 A | 7/2000 | Bruehmann et al. | |
| 6,986,645 B2 * | 1/2006 | Iwanami et al. | 417/16 |
| 7,226,273 B2 | 6/2007 | Doerr et al. | |
| 2005/0133489 A1 * | 6/2005 | Gitter et al. | 219/133 |
| 2008/0173033 A1 * | 7/2008 | Colavincenzo | 62/133 |
| 2009/0133394 A1 | 5/2009 | Fries et al. | |

FOREIGN PATENT DOCUMENTS

| | | |
|---|---|---|
| DE | 195 15 895 A1 | 10/1996 |
| DE | 197 37 051 A1 | 3/1999 |
| DE | 10 2006 023 681 A1 | 11/2007 |
| EP | 1 396 406 A1 | 3/2004 |
| WO | WO 98/07588 A1 | 2/1998 |

OTHER PUBLICATIONS

International Search Report dated Aug. 4, 2009 with English translation (four (4) pages).
German Search Report dated Dec. 4, 2009 with English translation (six (6) pages).

* cited by examiner

*Primary Examiner* — Devon Kramer
*Assistant Examiner* — Thomas Fink
(74) *Attorney, Agent, or Firm* — Crowell & Moring LLP

(57) ABSTRACT

A compressor system and method of operating same are provided for the compressed air supply of a commercial vehicle, wherein the compressor system includes a compressor for compressed air generation, a transmission for transmitting torque from a drive motor to the compressor, a clutch for disconnecting the connection between compressor and drive motor, and a control unit for opening and closing the clutch. The control unit is capable of opening the clutch in the event a settable maximum allowed compressor speed or motor speed of the drive motor is exceeded and to close the open clutch temporarily when the motor speed is greater than the maximum allowed motor speed.

15 Claims, 4 Drawing Sheets

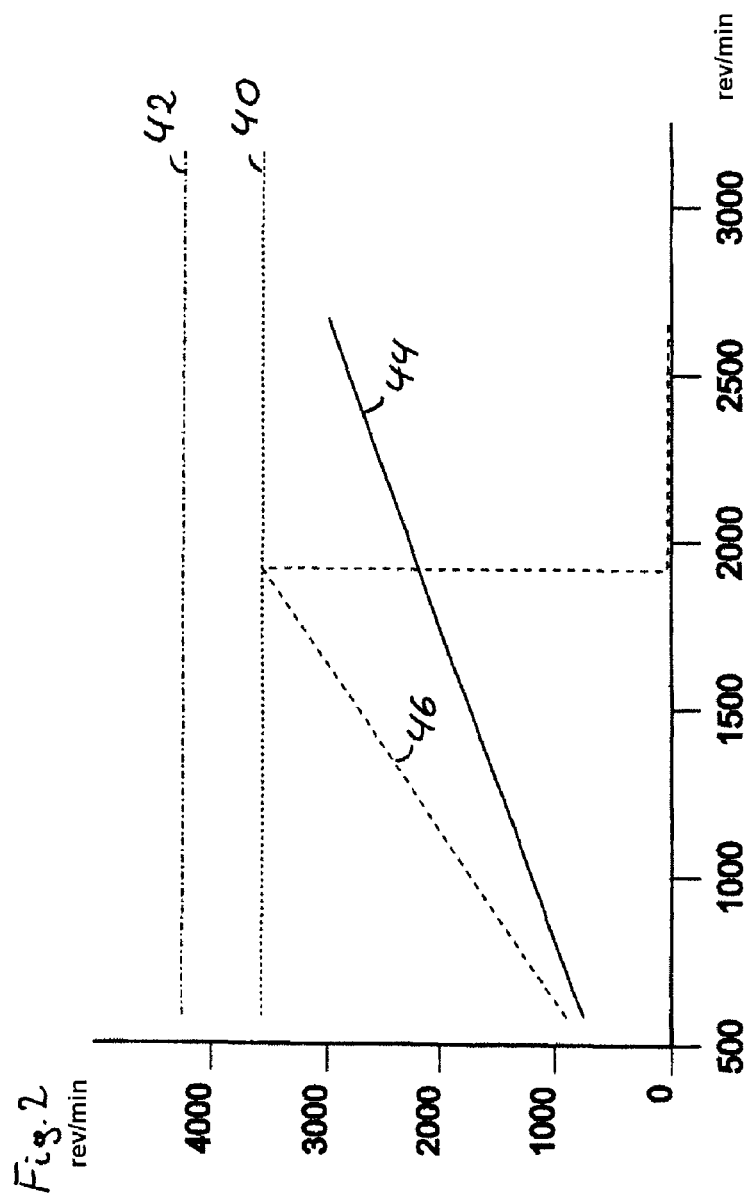

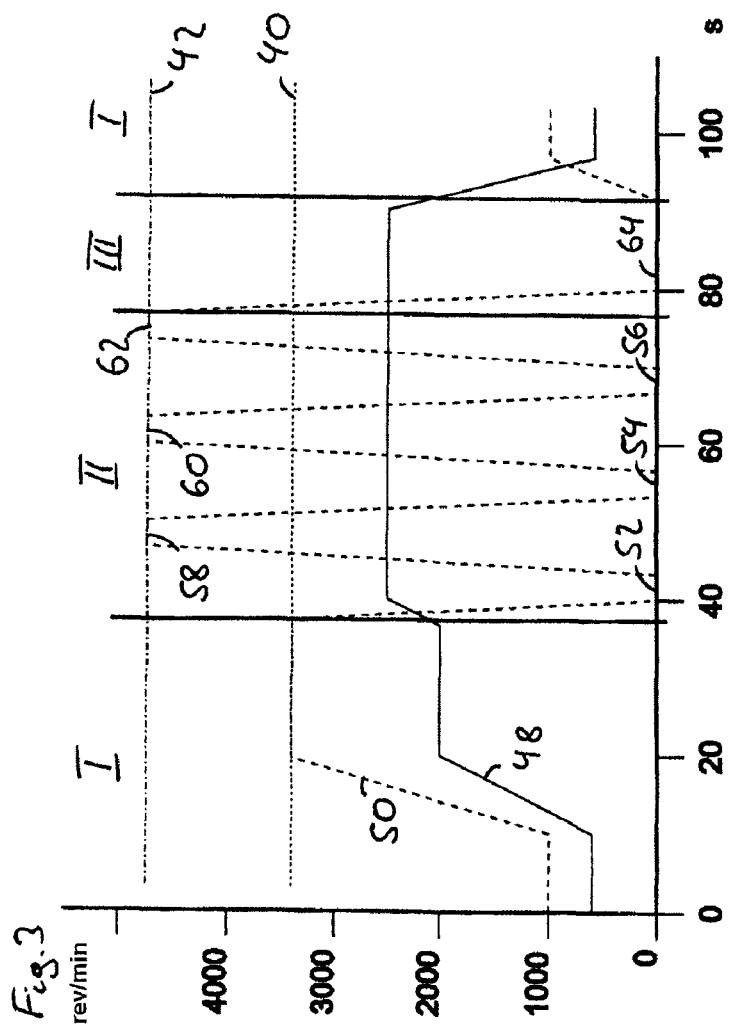

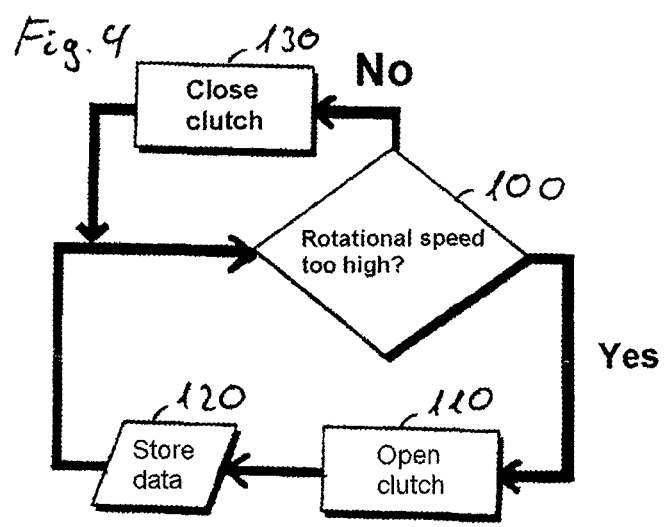

COMPRESSOR AND METHOD FOR CONTROLLING A COMPRESSOR FOR THE COMPRESSED AIR SUPPLY OF A COMMERCIAL VEHICLE

CROSS-REFERENCE TO RELATED APPLICATIONS

This application is a continuation of PCT International Application No. PCT/EP2009/000142, filed Jan. 13, 2009, which claims priority under 35 U.S.C. §119 from German Patent Application No. DE 10 2008 005 428.3, filed Jan. 22, 2008, the entire disclosures of which are herein expressly incorporated by reference.

BACKGROUND AND SUMMARY OF THE INVENTION

The invention relates to a compressor system for the compressed air supply of a commercial vehicle, the compressor system comprising a compressor for compressed air generation, a transmission for the transfer of torque from an engine to the compressor, a clutch for separating the connection between the compressor and the engine, and a control unit for opening and closing the clutch.

The invention relates, furthermore, to a method for controlling a compressor system, driven by an engine of a commercial vehicle, for the compressed air supply of the commercial vehicle, the compressor system comprising a compressor for compressed air generation, a transmission for the transfer of torque from the engine to the compressor, a clutch for separating the connection between the compressor and the engine, and a control unit for opening and closing the clutch.

So that the compressed air demand of subsystems of modern commercial vehicles can be satisfied, the compressors belonging to a compressed air supply device are equipped with a falling step-up ratio. The step-up ratio i between the rotational speed of the drive shaft $n_{drive}$, which is identical to the engine rotational speed, and the rotational speed of the output shaft $n_{output}$, which is identical to the compressor rotational speed, is in this case defined as:

$$i = \frac{n_{drive}}{n_{output}}$$

and is selected so as to be as low as possible.

This is advantageous, since, particularly in the case of low engine rotational speeds, there is often an increased demand for air by the commercial vehicle. This is the case, for example, in container-changing operation or with regard to a bus which approaches a stop. The latter has to stop there, open the doors, first deaerate the air suspension, in order to make it possible to climb out easily if the floor level of the bus is low, close the doors again and then aerate the air suspension again before starting up. All the actions mentioned consume a large amount of air which has to be applied when the engine rotational speed is low.

As a result of the falling step-up ratio, however, the air quantity conveyed is increased greatly not only at low, but also at high engine rotational speeds, with the result that extreme loads upon the compressor may occur. This applies particularly since the nominal rotational speed of the engine of approximately 2000 revolutions per minute may be markedly overshot by the braking rotational speed (~2400 rev/min) in the event of engine braking. The problem, here, is that, when engine braking is carried out, it is not desirable to cut off the compressor by use of the clutch in order to protect it, since air is possibly required for the service brake for braking the vehicle. This air consumption is even to be assumed since the commercial vehicle is already to be braked by the engine brake.

The object on which the invention is based is to provide a compressor system which can be operated with a step-up ratio markedly lower than one, while, in particular, the thermal and mechanical load occurring on the compressor is reduced at high engine rotational speeds.

This object is achieved by a compressor system for the compressed air supply of a commercial vehicle, the compressor system comprising a compressor for compressed air generation, a transmission for the transfer of torque from an engine to the compressor, a clutch for separating the connection between the compressor and the engine, and a control unit for opening and closing the clutch. The control unit is suitable for opening the clutch when an adjustable maximum permitted compressor rotational speed or engine rotational speed of the engine is overshot and for temporarily closing the open clutch while the engine rotational speed is higher than the maximum permitted engine rotational speed.

The invention provides a control unit that is suitable for opening the clutch when an adjustable maximum permitted compressor rotational speed or engine rotational speed of the engine is overshot and for temporarily closing the open clutch while the engine rotational speed is higher than the maximum permitted engine rotational speed. By the clutch being opened, the mechanical and thermal load upon the compressor when an adjustable maximum permitted rotational speed is overshot is first reduced to zero. By the clutch subsequently being closed temporarily while the engine rotational speed is higher than the maximum permitted engine rotational speed, on the one hand, the compressed air generation required is maintained and, on the other hand, the mean thermal and mechanical load upon the compressor is reduced, as compared with the continuous operation. Typical step-up ratios at which the use of a compressor system according to the invention is especially preferred lie between 0.4 and 0.7, although the compressor according to the invention can be used, in general, when low step-up ratios or high nominal rotational speeds of the engine result when compressor rotational speeds are high.

Expediently, there may also be provision for the control unit to be suitable for opening the clutch when a pressure present in the compressed air supply system of the commercial vehicle overshoots an adjustable cut-off pressure. If the storage containers for compressed air of the commercial vehicle are sufficiently full, a further generation of compressed air by the compressor is unnecessary. The pressure prevailing in the compressed air supply system of the commercial vehicle may be adopted as a simple indicator of the degree of filling.

Advantageously, there may also be provision for the control unit to be suitable for opening the clutch while the engine is being started. By the clutch being opened while the engine is being started, the torque to be applied by a starter in order to start the engine can be reduced.

Furthermore, there may be provision for a temperature sensor to be provided, which detects the temperature of the compressor. The temperature of the compressor may be adopted as a measure of the thermal load upon the compressor.

In particular, there may be provision for the transmission to have a step-up lower than one. By a step-up lower than one being used, the compressor rotational speed rises in relation to the engine rotational speed, and consequently the volume of the compressed air generated rises in the case of a specific rotational speed of the engine. Thus, particularly in the case of low engine rotational speeds, the compressed air quantity required can be provided quickly.

The invention relates, furthermore, to a commercial vehicle having a compressor system according to the invention.

According to the invention, the clutch is opened when an adjustable maximum permitted compressor rotational speed or engine rotational speed of the engine is overshot, and an open clutch is temporarily closed while the engine rotational speed is higher than the maximum permitted engine rotational speed.

Thus, the advantages and particular features of the compressor system according to the invention are also implemented within the framework of a method. This also applies to the particularly preferred embodiments, given below, of the method according to the invention.

The method is expediently developed in that the clutch is opened when a pressure present in the compressed air supply system of the commercial vehicle overshoots an adjustable cut-off pressure. Furthermore, there may be provision for the clutch to be opened while the engine is being started. There may also be provision for the clutch to be opened when a measured temperature of the compressor overshoots an adjustable maximum permitted temperature. In this regard, there may be provision, furthermore, for the clutch to be temporarily closed while a measured temperature of the compressor overshoots an adjustable maximum permitted temperature.

In particular, there may be provision for the transmission to transfer the engine rotational speed to the compressor with a step-up lower than one.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a graph showing two switching strategies for operating a compressor system;

FIG. 3 is a graph showing a switching strategy according to the invention for operating a compressor system; and FIG. 4 is a flow chart on which the individual method steps are explained.

DETAILED DESCRIPTION OF THE DRAWINGS

Figure 1:
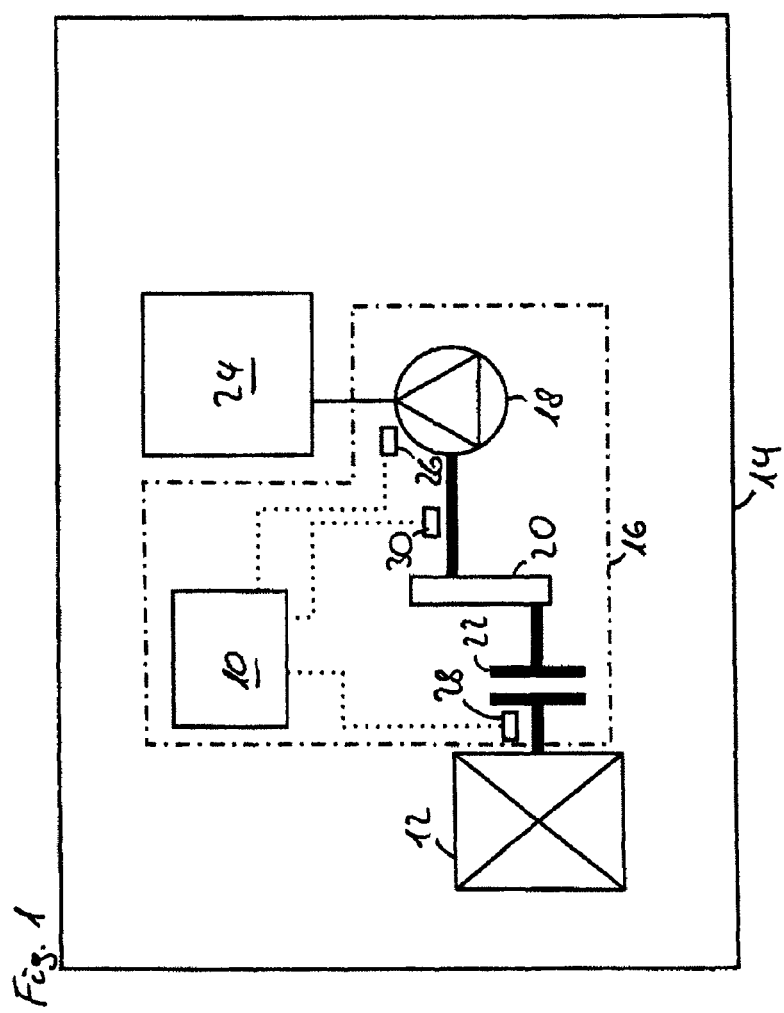
FIG. 1 is a diagrammatically simplified illustration of a vehicle having a compressor system according to the invention.

In the following drawings, the same reference symbols designate identical or similar parts in the drawings.

FIG. 1 shows a diagrammatically simplified illustration of a vehicle having a compressor system 16 according to the invention. The commercial vehicle 14 is driven by an engine 12. The engine 12, furthermore, drives via a transmission 20 a compressor 18 which makes air available in compressed form to a compressed air supply system 24. The transmission 20 possesses a step-up ratio i lower than one, that is to say the drive rotational speed $n_{drive}$, which is identical to the engine rotational speed, is lower than the output rotational speed $n_{output}$, which is identical to the compressor rotational speed.

The compressor rotational speed is therefore always higher than the engine rotational speed by the fixed factor i.

Arranged between the transmission 20 and the engine 12 is a clutch 22, via which the compressor 18 can be separated from the engine 12. The order of the transmission 20 and clutch 22 may also be reversed, this even being the more customary type of arrangement since the transmission 20 is usually designed as an integral part of the engine 12, a gearwheel then being fastened on the compressor crankshaft.

The compressor 18, together with the transmission 20, the clutch 22 and a control unit 10 also arranged in the commercial vehicle 14, forms a compressor system 16. Furthermore, rotational speed sensors 28, 30 and a temperature sensor 26 are provided in the compressor system 16, the rotational speed sensors 28, 30 detecting the engine rotational speed and the compressor rotational speed respectively, while the temperature sensor 26 detects the compressor temperature.

The control unit 10 is coupled to the rotational speed sensors 28, 30 and to the temperature sensor 26 and is capable of opening and closing the clutch 22. The rotational speed monitoring of the compressor may also take place without the rotational speed sensors 28, 30, in which case the usually known engine rotational speed is transmitted via a vehicle bus, for example the CAN bus, to the control unit 10 which then determines the compressor rotational speed in relation to the step-up of the transmission 20. Determination via the engine rotational speed is even preferable since separate rotational speed sensors 28, 30 for directly determining the compressor rotational speed may then be dispensed with. Typical step-up ratios at which the use of a compressor system according to the invention is especially preferred lie between 0.4 and 0.7, but the compressor system according to the invention can also be used in the case of other step-up ratios.

FIG. 2 shows two switching strategies for operating a compressor system. The engine rotational speed is plotted on the x-axis and the compressor rotational speed on the y-axis. Furthermore, a permanently permitted compressor rotational speed 40 and a briefly permitted compressor rotational speed 42 are depicted parallel to the x-axis. On account of the selected step-up ratio, a first compressor rotational speed curve 44 remains below the permanently permitted compressor rotational speed 40 independently of the engine rotational speed. The switching of the compressor via the clutch is therefore not necessary. A second compressor rotational speed curve 46 would overshoot the permanently permitted compressor rotational speed 40 in the case of an engine rotational speed of approximately 1900 revolutions per minute. The clutch is opened at this point, whereupon the compressor rotational speed falls to zero, and, if the engine rotational speed rises further, also remains at zero. This switching strategy has disadvantages, since air conveyance is stopped completely as a result of the opening of the clutch at a high engine rotational speed.

FIG. 3 shows a switching strategy according to the invention for operating a compressor system. The time is plotted on the x-axis and the engine rotational speed or compressor rotational speed is plotted on the y-axis. The permanently permitted compressor rotational speed 40 and the briefly permitted compressor rotational speed 42 are again depicted parallel to the x-axis. A depicted engine rotational speed curve 48 grows from the idling rotational speed of approximately 600 revolutions per minute up to the nominal rotational speed of the engine of approximately 2000 revolutions per minute, in order, via the braking rotational speed of the engine, of approximately 2400 revolutions per minute, to fall again down to the idling rotational speed. A compressor rotational speed curve 50 according to the invention identifies the compressor rotational speed belonging to the engine rotational speed curve 48. During a first phase I, which ranges from zero to approximately 36 seconds, the clutch 22 of the compressor 18 is closed and the compressor 18 is in permanent operation. When the nominal rotational speed of the engine 12 is reached, the compressor rotational speed curve 50 according to the invention reaches the permanently permitted compressor rotational speed 40. By engine braking being initiated, the engine 12 reaches the braking rotational speed in a phase II. The compressor rotational speed belonging to the braking rotational speed when the clutch is closed corresponds to the briefly permitted compressor rotational speed 42 which is higher than the permanently permitted compressor rotational speed 40. Consequently, first, at the commencement of phase II the clutch 22 is opened by means of the control unit 10, and therefore the compressor rotational speed curve 50 falls to zero and remains at this value during a cut-off interval 52. So that the generation of compressed air can be recommenced, the clutch 22 is closed again at the end of the cut-off interval 52, and therefore, after a short time, the compressor 18 reaches the briefly permitted compressor rotational speed 42 and maintains this value during a load interval 58. At the end of the load interval 58, the clutch 22 is opened again and a further cut-off interval 54 is initiated. Further load intervals 60, 62 and a cut-off interval 56 follow. At the end of the load interval 62, the third phase III, characterized by a long cut-off interval 64, also starts. At the end of the load interval 62, the compressed air supply system 24 reaches its cut-off pressure in this example, since the storage containers of the compressed air supply system 24 are full. In order to save energy, the clutch 22 of the compressor 18 is opened permanently. At the end of the third phase III, the air quantity stored in the compressed air supply system undershoots a predetermined minimum, that is to say a measured cut-in pressure is undershot. Consequently, the clutch 22 is closed again. Since, at the same time, the engine braking is terminated and the engine rotational speed of the engine 12 lies below the nominal rotational speed of the engine 12, the clutch 22 remains closed and the compressor 18 is operated permanently again.

FIG. 4 is a flow chart on which the individual method steps are explained. Starting from step 100, a check is made as to whether the engine rotational speed of the engine 12 or the compressor rotational speed of the compressor 18 is higher than a maximum permitted rotational speed. This may take place by the monitoring either of the engine rotational speed of the engine 12, of the compressor rotational speed, or of the accelerator pedal position in conjunction with the gear selection. A direct monitoring of the temperature of the compressor 18 may likewise be envisaged, since the thermal load upon the compressor 18 is related to the compressor rotational speed. Furthermore, the engine load of the engine 12 may be taken into account, in particular if an additional supercharging of the compressor 18 by a turbocharger is provided.

If the compressor rotational speed reached by the compressor 18 is higher than the permitted rotational speed, 100-yes, the clutch 22 is opened by the control unit 10 at 110. Subsequently, at 120, the opening of the clutch 22 is stored for the later diagnosis or statistical evaluation. The process is then resumed at 100. If the compressor rotational speed is lower than the maximum permitted rotational speed, 100-no, the process is continued at 130. The control unit 10 closes the clutch 22 in order to recommence the air conveyance of the compressor 18. Subsequently, the process is continued at 100. It should be noted that, at 100, the current compressor rotational speed of the compressor 18 does not have to be taken into account, but, instead, the rotational speed which the compressor 18 would have if the clutch 22 were closed. Furthermore, it should be noted that the cut-in of the compressor 18 may take place even in the case of a cut-in pressure which is lower than usual. However, the cut-in pressure must always lie above the statutorily prescribed minimum pressure. As a result, the protection of the compressor 18 against mechanical overstress at high rotational speeds is further improved, because the actuation of the compressor 18 at high rotational speeds occurs less often.

| Table of Reference Symbols | |
|---|---|
| 10 | Control unit |
| 12 | Engine |
| 14 | Commercial vehicle |
| 16 | Compressor system |
| 18 | Compressor |
| 20 | Transmission |
| 22 | Clutch |
| 24 | Compressed air supply system |
| 26 | Temperature sensor |
| 28 | Engine rotational speed sensor |
| 30 | Compressor rotational speed sensor |
| 40 | Permanently permitted compressor rotational speed |
| 42 | Briefly permitted compressor rotational speed |
| 44 | First compressor rotational speed curve |
| 46 | Second compressor rotational speed curve |
| 48 | Engine rotational speed curve |
| 50 | Compressor rotational speed curve according to the invention |
| 52 | Cut-off interval |
| 54 | Cut-off interval |
| 56 | Cut-off interval |
| 58 | Load interval |
| 60 | Load interval |
| 62 | Load interval |
| 64 | Cut-off interval |
| 100 | Rotational speed higher than permitted rotational speed? |
| 110 | Open clutch |
| 120 | Store data |
| 130 | Close clutch |
| I | Permanent operation |
| II | Interval operation |
| III | Compressor deactivated |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressor system for compressed air supply of a commercial vehicle, the compressor system comprising:
   a compressor for compressed air generation;
   a transmission for transferring torque from an engine of the commercial vehicle to the compressor;
   a clutch for separating a connection between the compressor and the engine; and
   a control unit operatively configured for opening and closing the clutch, the control unit initially opening the clutch when a permanently permitted compressor rotational speed or an adjustable maximum permitted engine rotational speed of the engine is overshot and subsequently temporarily closing and fully engaging the clutch while the engine rotational speed is higher than the adjustable maximum permitted engine rotational speed such that the compressor is permitted to temporarily exceed the permanently permitted compressor rotational speed.

2. The compressor system according to claim 1, wherein the control unit is further operatively configured for opening the clutch when a pressure present in the compressed air supply system of the commercial vehicle overshoots an adjustable cut-off pressure.

3. The compressor system according to claim 1, wherein the control unit is further operatively configured for opening the clutch while the engine is being started.

4. The compressor system according to claim 2, wherein the control unit is further operatively configured for opening the clutch while the engine is being started.

5. The compressor system according to claim 1, further comprising a temperature sensor for detecting a temperature of the compressor.

6. The compressor system according to claim 1, wherein the transmission has a step-up ratio of less than one.

7. A method for controlling a compressor system driven by an engine of a commercial vehicle for compressed air supply of the commercial vehicle, the compressor system including a compressor for compressed air generation, a transmission for transferring torque from the engine to the compressor, a clutch for separating a connection between the compressor and the engine, and a control unit for opening and closing the clutch, the method comprising the acts of:
    initially opening the clutch when a permanently permitted compressor rotational speed or an adjustable maximum permitted engine rotational speed is overshot; and
    subsequently temporarily closing and fully engaging the clutch while the engine rotational speed is higher than the adjustable maximum permitted engine rotational speed such that the compressor is permitted to temporarily exceed the permanently permitted compressor rotational speed.

8. The method according to claim 7, further comprising the act of opening the clutch when a pressure present in the compressed air supply of the commercial vehicle overshoots an adjustable cut-off pressure.

9. The method according to claim 7, further comprising the act of opening the clutch while the engine is being started.

10. The method according to claim 8, further comprising the act of opening the clutch while the engine is being started.

11. The method according to claim 7, further comprising the act of opening the clutch when a measured temperature of the compressor overshoots an adjustable maximum permitted temperature.

12. The method according to claim 7, further comprising the act of temporarily closing the clutch while a measured temperature of the compressor overshoots an adjustable maximum permitted temperature.

13. The method according to claim 11, further comprising the act of temporarily closing the clutch while a measured temperature of the compressor overshoots an adjustable maximum permitted temperature.

14. The method according to claim 7, further comprising the act of transferring the engine rotational speed via the transmission to the compressor utilizing a step-up ratio of less than one.

15. A commercial vehicle, comprising:
    an engine of a commercial vehicle;
    a compressor system for compressed air supply of the commercial vehicle, the compressor system comprising:
    a compressor for compressed air generation;
    a transmission for transferring torque from the engine of the commercial vehicle to the compressor;
    a clutch for separating a connection between the compressor and the engine; and
    a control unit operatively configured for opening and closing the clutch, the control unit initially opening the clutch when a permanently permitted compressor rotational speed or an adjustable maximum permitted engine rotational speed of the engine is overshot and subsequently temporarily closing and fully engaging the clutch while the engine rotational speed is higher than the adjustable maximum permitted engine rotational speed such that the compressor is permitted to temporarily exceed the permanently permitted compressor rotational speed.

* * * * *